US005397184A

United States Patent [19]
Murai

[11] Patent Number: 5,397,184
[45] Date of Patent: Mar. 14, 1995

[54] HYDROSTATIC GAS BEARING

[75] Inventor: Takashi Murai, Kanagawa, Japan

[73] Assignee: NSK, Ltd., Tokyo

[21] Appl. No.: 226,646

[22] Filed: Apr. 12, 1994

[30] Foreign Application Priority Data

Apr. 13, 1993 [JP] Japan .................. 5-086110

[51] Int. Cl.$^6$ .............................. F16C 32/06
[52] U.S. Cl. ................... 384/110; 384/107; 384/279; 384/902
[58] Field of Search ............... 384/100, 107, 109, 110, 384/279, 280, 281, 295, 297, 902

[56]  References Cited
U.S. PATENT DOCUMENTS

| | | | |
|---|---|---|---|
| 2,696,410 | 12/1954 | Topanelian, Jr. | 384/110 X |
| 3,537,763 | 11/1970 | Unterberger | 384/109 |
| 3,973,810 | 8/1976 | Montag | 384/110 |
| 4,884,899 | 12/1989 | Schwartzman | 384/100 |
| 4,919,547 | 4/1990 | Schwartzman | 384/110 |

FOREIGN PATENT DOCUMENTS 56-19499 5/1981 Japan .
5187443 7/1993 Japan .

*Primary Examiner*—Thomas R. Hannon
*Attorney, Agent, or Firm*—Helfgott & Karas

[57] ABSTRACT

A hydrostatic gas bearing comprises a pair of bearing structural members 4 which make up an inner ring 3 and each have a frusto-conical engaging face 5 formed on the radially outer peripheral surface thereof, a pair of bearing members 2 which are fixed to the respective bearing structural members 4, and each formed with a radially inner engaging face 6 for engagement with the taper of the engaging face 5, and an outer bearing surface 10 which is aligned parallel to the inner engaging face 6, wherein since each bearing member 2 is pressed in an axial direction by an attachment member 7 and thereby fastened with a uniform pressing force to the bearing structural member 4, positional displacement of the bearing member 2 relative to the bearing structural member 4 and uneven deformation of the bearing member 2 can be suppressed so that bearing characteristics can be maintained in a simple structure.

5 Claims, 2 Drawing Sheets

HYDROSTATIC GAS BEARING

FIELD OF THE INVENTION

The present invention relates to hydrostatic gas bearings, in particular, to hydrostatic gas bearings in a large size which can support both radial and thrust loads.

DESCRIPTION OF THE RELATED ART

A hydrostatic gas bearing of this type such as shown for example in FIG. 1, comprises a cylindrical bearing member A which is made from a porous material and has a bearing surface H to support a rotating body (not shown) on it, and a cylindrical bearing structural member C which is attached to the bearing member A and has a supply port B incorporated for supplying air to the bearing member A. Thus, the rotating body (not shown) is rotated around its axis X-Y.

The bearing member A is fitted with attachment members E formed with threaded holes D, and is pressed by the attachment members E against the bearing structural member C. Specifically, bolts F are passed from the side of the bearing structural member C through the bearing member A to the attachment members E, and the threaded ends of the bolts F are screwed and tightened into the threaded holes D of the attachment members E.

In this case as shown for example in the same figure, resilient pre-load members G are interposed between the seating faces of the bolts F and the bearing structural member C. Then, when the bolts F are tightened, the resilient pre-load members G are resiliently deformed, so that the resultant resilient restoring forces are applied through the bolts F, as a pre-load to the attachment members E, bearing member A and bearing structural member C. Dimensional changes in the respective components caused by temperature can thus be accommodated by resilient deformation of the resilient pre-load members G, so that the bearing member A is always .supported under a constant pressing load by the bearing structural member C, thus minimizing deterioration in bearing characteristics.

Air supplied from the supply port B to the bearing member A, passes through microscopic holes in the porous material of the bearing member A to discharge from the bearing surface H. Due to the pressure produced by the discharging air, a thin air layer is formed between the rotating body (not shown) and the bearing surface H of the bearing member A, thereby supporting the rotating body so as to rotate freely around its axis X-Y.

The conventional hydrostatic gas bearing is complicated in construction by having two attachment members E. Furthermore, due to the provision of a large number of resilient pre-load members G, any variations in mechanical properties and bolt tightening loads can result in non-uniform pressing loads being applied to the bearing member A at the respective locations. Accordingly the uniform attachment of the bearing member A to the bearing structural member C is lost, so that gaps or clearances are formed between the bearing member A and the bearing structural member C allowing leakage of the air supplied to the supply port B of the bearing structural member C, and that the bearing member A becomes unevenly deformed. This results in a deterioration in bearing characteristics.

Moreover, since the bearing member A and the bearing structural member C are in cylindrical plane contact with each other, then when an excessive external force is applied so that the resilient limits of the resilient pre-load members G are exceeded, the bearing member A can become positionally displaced with respect to the bearing structural member C, making it difficult to maintain accuracy. Such problems are prominent with the hydrostatic conical gas bearings of the heavily loaded large size type, and in extreme cases can develop into seizure between the bearing member and the rotating body.

SUMMARY OF THE INVENTION

In view of the above problems, it is an object of the present invention to provide a hydrostatic gas bearing of a simple construction comprising a bearing member which can be pressingly supported by a bearing structural member with a uniform pressing force, such that positional displacement and uneven distortion of the bearing member can be prevented, while the bearing characteristics can be maintained.

The hydrostatic gas bearing of the present invention has a bearing structural member and a bearing member for supporting a rotating body wherein the bearing member is pressingly attached to the bearing structural member by an attachment member. Specifically, the bearing member and the bearing structural member have engaging faces which are engaged with each other and formed with a taper shape such that the engaging faces are inclined with respect to the axial direction of the bearing, and the bearing member is pressed in an axial direction by the attachment member and thereby fastened to the bearing structural member.

With the hydrostatic gas bearing of the present invention, the engaging faces of the bearing member and bearing structural member engaged with each other are formed with a taper shape which is inclined with respect to the axial direction of the bearing, and the bearing member is pressed in an axial direction by the attachment member. As a result, the engaging bearing member and bearing structural member are mated together in a taper fitting relationship, with the bearing member positionally located at a predetermined position with respect to the bearing structural member due to the centripetal or inward-pressing tendency in the taper fitting relationship. The axial pressing force applied by the attachment member is thus distributed as a uniform pressing force with respect to the whole of the tapered engaging face. The likelihood of uneven deformation of the bearing member is therefore minimized so that deformation of the bearing surface, and leakage of the supplied air is avoided. Furthermore, even with a very large external force, there is little likelihood of displacement of the bearing member with respect to the bearing structural member.

DESCRIPTION OF THE PREFERRED EMBODIMENTS

Figure 1:
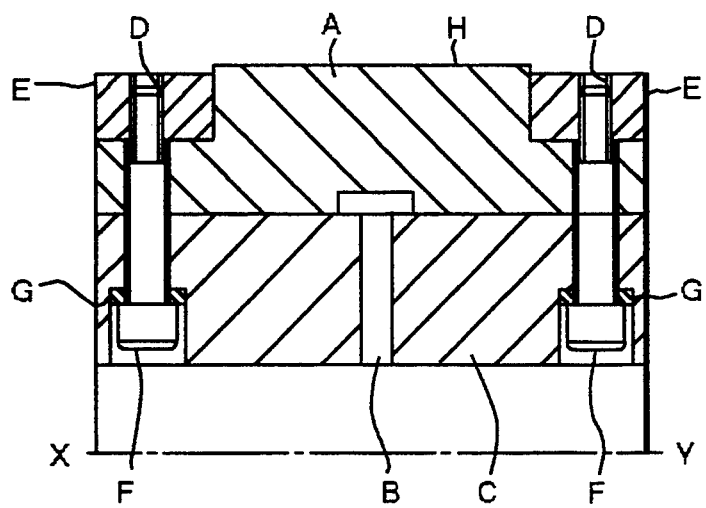
FIG. 1 is a longitudinal cross-sectional view showing an example of a conventional hydrostatic gas bearing.
Figure 2:
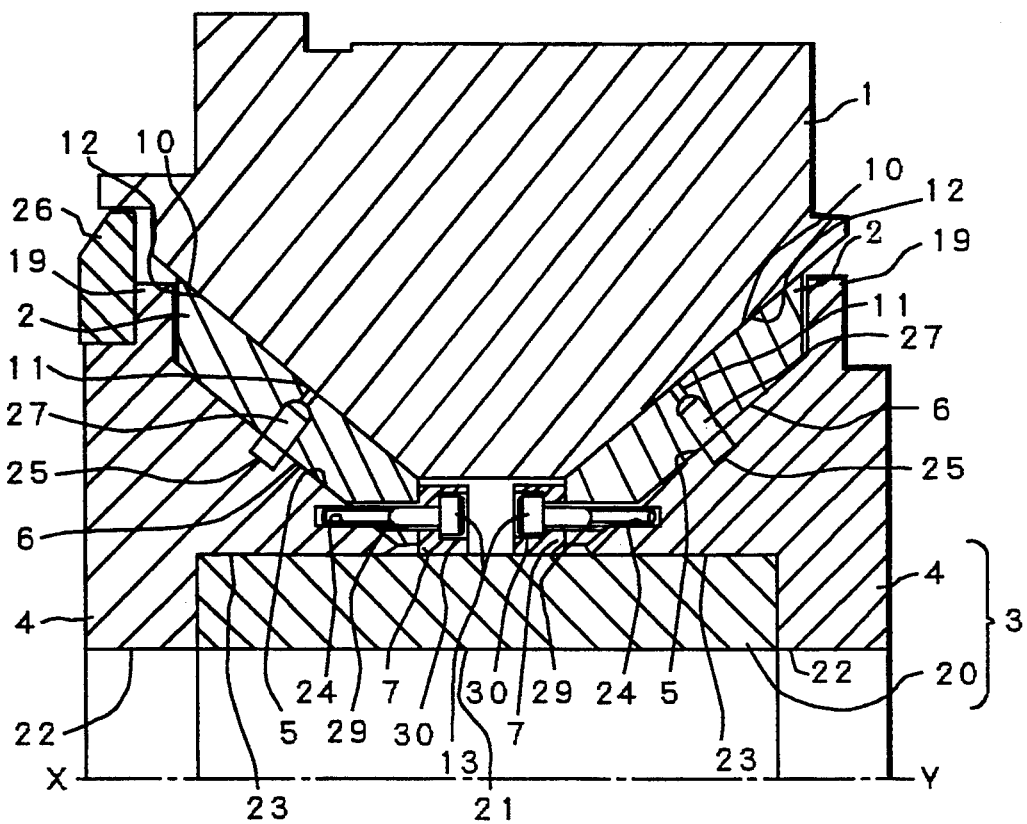
FIG. 2 is a longitudinal cross-sectional view showing a first embodiment of a hydrostatic gas bearing according to the present invention.

FIG. 2 shows a first embodiment of a hydrostatic gas bearing according to the present invention to support an outer ring 1. The hydrostatic gas bearing is applicable to large sized conical bearings which support both thrust and radial loads, and comprises a pair of flared bearing members 2 and a pair of frusto-conical or generally conical bearing structural members 4 arranged in a concentric relationship around the bearings X-Y. Two radially outward facing bearing surfaces 10 respectively are formed in a frusto-conical or generally conical shape on the two bearing members 2, and arranged coaxial with the bearing axis X-Y so as to face each other. The outer ring 1 (rotating body) has an inner peripheral shape which matches the frusto-conical shape of the two bearing surfaces 10, and rotates around its axis X-Y. Compressed air is discharged from orifices 11 formed in the respective bearing surfaces 10 of the two bearing members 2, so as to form an air layer between the inner peripheral surface of the outer ring 1 and the bearing surfaces 10, thereby supporting the outer ring 1 by the pressure force created therebetween to rotate without contacting the bearing surfaces 10.

The pair of bearing structural members 4 are combined with a cylindrical collar 20 disposed therebetween to form an inner ring 3. The bearing structural members 4 each have an inner bore 22 formed therein so as to be continuous with an inner bore 21 of the collar 20. The collar 20 is fitted into recess portions 23 formed in the axially opposed portions of the bearing structural members 4, so that the opposite ends of the collar 20 axially control the end faces of the recess portions 23 and thus position the pair of bearing structural members 4 with a predetermined spacing therebetween.

Two frusto-conical or tapered engaging faces 5 are defined in facing relation to each other by the outer peripheral surfaces of the bearing structural members 4. The engaging faces 5 are respectively defined by a frusto-conical surface which is inclined at an angle of approximately 45 degrees with respect to the axial direction of the bearing (and with respect to the radial direction). The bearing structural members 4 have a retaining rim 19 projecting from a larger diameter portion thereof, and a plurality of axially aligned threaded holes 24 are tapped into a smaller diameter portion of the respective bearing structural member 4 through each engaging face 5 so that the holes 24 are arranged at even spacing around a circumferential direction of the bearing structural member 4. An air supply groove 25 is formed in a central portion of each engaging face 5 around the circumferential direction thereof, for receiving compressed air from a supply port (not shown in the figure). The respective bearing structural members 4 and the collar 20 are integrally fixedly attached by fastening members such a bolts (not shown in the figure). A sealing member 26 is fitted to the bearing structural member 4 (on the left side in FIG. 2) at the larger diameter portion thereof adjacent to the rim 19.

The bearing structural members 4 as well as the collar 20 are made from a ferrous type metal or alloy material.

The two bearing members 2 supported in the respective bearing structural members 4 are each flared in a frusto-conical dish shape and formed with a radially inner engaging face 6 for taper engagement with the engaging face 5 of the respective bearing structural member 4, and a radially outer bearing surface 10 which is aligned parallel to or closely parallel to the radially inner engaging face 6.

The bearing members 2 are provided with supply ports 27 which are directed towards the radially outer bearing surface 10 and with orifices 11 opened on the radially outer bearing surface 10. The supply ports 27 are drilled in each bearing member 2 at positions corresponding to the supply groove 25, and communicated with the bearing surface 10 by way of the orifices 11.

The frusto-conical bearing members 2 are each formed so that the larger diameter end portion thereof does not contact the retaining rim 19 of the respective bearing structural member 4. Through holes 29 are formed in the smaller diameter end portion of each frusto-conical bearing member 2 at locations corresponding to the threaded holes 24 formed in the respective bearing structural member 4.

The bearing means 2 are made from a solid lubricant material such as graphite or carbon and the like which has good anti-seizing properties.

Two attachment members 7 for attaching the bearing members 2 to the bearing structural members 4 are each formed in a ring shape, and provided with an inner diameter slightly larger than the outer diameter of the collar 20, and an outer diameter slightly smaller than the radially innermost diameter of the bearing surface 10, and with bolt counterbores 30 formed at equiangular spacing around a circumferential direction thereof. Each attachment means 7 is axially fitted to the smaller diameter end portion of the respective bearing member 2, with bolts 13 inserted into the bolt counterbores 30 and passing through the holes 29 in the bearing member 2 to thread into the threaded holes 24 formed in the bearing structural members 4. By tightening the bolts 13 a pressing force is applied in the axial direction between the engaging face 5 of the bearing structural member 4 and the engaging face 6 of the bearing member 2. Here the engaging faces 5 and 6, which are both inclined at an angle of approximately 45 degrees with reference to the axial and radial directions, are closely engaged together. As a result, the axial pressing force is divided into axial (thrust) and radial components which are uniform over the whole of the engaging faces 5 and 6.

Furthermore, since the solid lubricant material such as graphite or carbon which constitutes the bearing members 2 has a smaller Young's modulus than that of the metallic bearing structural members 4, the bearing members 2 are deformed to follow the shape of the respective bearing structural members 4 with application of the axial pressing force, so that both members are tightly fitted together. Leakage of compressed air from the supply groove 25 can thus be suppressed.

The ring shaped outer ring 1 of the present embodiment has flared bearing surfaces 12 formed on the radially inner peripheral faces thereof, which oppose the respective frusto-conical bearing surfaces 10 of the bearing members 2 across a bearing gap or clearance between them.

Consequently, in assembling the hydrostatic gas bearing of the present embodiment, one of the bearing structural members 4 is first fixedly attached to one of the bearing members 2 by one of the attachment means 7 and the bolts 13 are tightened as previously described, and then the composite of bearing member 2 and bearing structural member 4 is fitted to one end of the collar 20, and fixedly attached thereto by fastening members such as bolts (not shown in the figure). The bearing surface 10 of the bearing member 2 is then positioned opposite to the corresponding bearing surface 12 of the outer ring 1. Subsequently, the other bearing structural member 4 to which the other bearing member 2 is fixedly attached by means of the other attachment means 7 with the bolts 13, is fitted to the other end of the collar 20, and fixedly attached thereto by fastening members such as bolts (not shown in the figure).

Compressed air is discharged from the orifices 11 so as to form an air layer between the bearing surfaces 10 and 12, so that the bearing members 2 support the outer ring 1 due to the pressure force created therebetween, so as to rotate the outer ring 1 without contact. In this case, even with application of an external force which exceeds that allowable for the bearing, since this is applied as a uniform force in both radial and axial (thrust) directions over the entire face of the tapered engaging faces 5 and 6, the bearing members 2 remain in position with respect to the bearing structural members 4. Also since air leakage and deformation of the bearing surfaces 10 is eliminated, then in particular, there is no longer the problem of seizing between the bearing members 2 and the outer ring 1.

Figure 3:
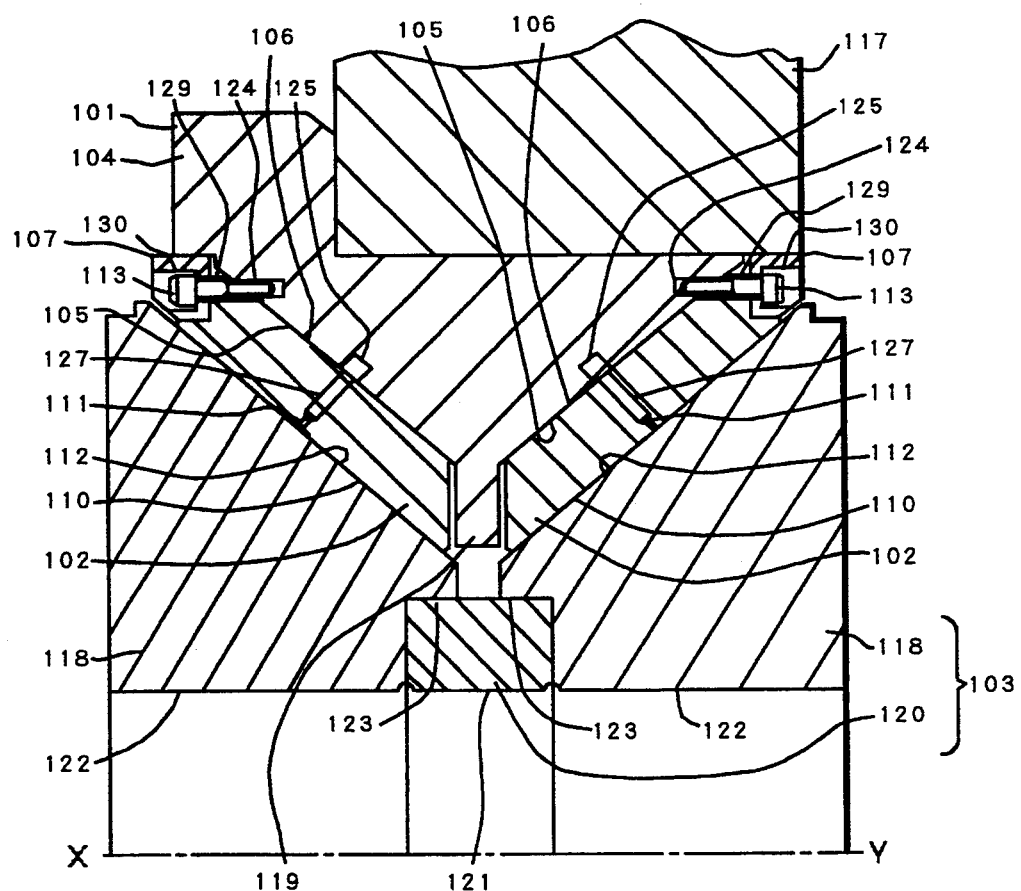
FIG. 3 is a longitudinal cross-sectional view showing a second embodiment of a hydrostatic gas bearing according to the present invention.

FIG. 3 shows another embodiment of a hydrostatic gas bearing according to the present invention to support an inner ring 103. The hydrostatic gas bearing of this embodiment is applicable to large sized conical bearings which support both thrust and radial loads, and comprises a single bearing structural member 104 and a pair of flared or frusto-conical bearing members 102 mounted to the bearing structural member 104 on its axially opposite sides. Two radially inward facing bearing surfaces 110 respectively formed in a taper shape on the two bearing members 102 coaxial with its axis X-Y, and arranged so as to axially face away from each other. The inner ring 103 comprises a pair of mating members 118 and a collar 120. The mating members 118 have a frusto-conical shape so as to match the shapes of the two bearing surfaces 110, so that the inner ring 103 rotates radially inside the bearing surfaces 110. Compressed air is discharged from orifices 111 formed in the respective bearing surfaces 110 of the two bearing members 102 so as to form an air layer between the radially outer surfaces the inner ring 103 and the bearing surfaces 110 of the bearing members 102, such that a pressure force is created therebetween, thereby supporting the inner ring 103 to rotate without contacting the bearing surfaces 110.

In the hydrostatic gas bearing of the second embodiment, the single bearing structural member 104 forms a stationary outer ring 101. The bearing structural member 104 is fixedly attached to a housing 117 with an inner bore by fasteners such as bolts (not shown in the figure), and is formed in a generally ring shape so as to fit into the inner bore of the housing 117. Two flared or tapered engaging faces 105 are formed on the radially inner peripheral surface of the bearing structural member 104 in an axially opposite relationship with each other. Specifically, the larger diameter portions of the engaging faces 105 are positioned at axially outer ends thereof so that their axially inwardly protruding smaller diameter portions are close to each other. The engaging faces 105 are each defined by the radially inner surfaces which are inclined at an angle of approximately 45 degrees with respect to the axial direction of the bearing (and with respect to the radial direction), and the bearing structural member 104 has a central retaining rim 119 radially inwardly projecting from the smaller diameter portions of the engaging faces 105, that is to say from the axially central portion of the innermost peripheral surface of the bearing structural member 104.

A plurality of threaded holes 124 are tapped into the axially outer edge portion of the bearing structural member 104, that is the larger diameter portion on each of the engaging faces 105 at even spacing around a circumferential direction of the bearing structural member 104, so that the threaded holes 124 are coaxial with the axis of the bearing. An air supply groove 125 is formed in an axially central portion of each tapered engaging face 105 around the circumferential direction thereof, for supplying compressed air from a supply port (not shown in the figure).

The bearing structural member 104 is made from a ferrous type metal or alloy material.

The two bearing members 102 which are supported in the bearing structural member 104, are each formed in a frusto-conical or flared shape and provided with a radially outer engaging face 106 for engagement with the tapered engaging face 105 of the bearing structural member 104, and a radially inner bearing surface 110 which is aligned parallel to or closely parallel to the outer engaging face 106. Supply ports 127 and orifices 111 directed towards the bearing surface 110, are drilled in each bearing member 102 at positions corresponding to the supply groove 125. The supply ports 127 are communicated with the bearing surface 110 by way of the orifices 111.

The bearing members 102 are each formed in a flared shape with a smaller diameter end portion positioned so as not to contact the retaining rim 119 of the bearing structural member 104, and with a larger diameter end portion formed with through holes 129 at locations corresponding to the respective threaded holes 124 formed in the bearing structural member 104.

The bearing members 102 are made from a solid lubricant material such as graphite or carbon and the like.

The ring shaped attachment members 107 for attaching the bearing members 102 to the bearing structural member 104 are each fitted to the bearing structural member 104 in a clearance fit relationship, and are formed with an inner diameter slightly larger than an outer diameter of the larger diameter end portion of the bearing surface 110 of the bearing member 102. Bolt counterbores 130 are formed at equi-angular spacing around a circumferential direction of the attachment members 107. Each attachment member 107 is fitted to the larger diameter end portion of the respective bearing member 102, with bolts 113 inserted into the bolt counterbores 130 so as to pass through the holes 129 in the bearing member 102 to thread into the threaded holes 124 formed in the bearing structural member 104. By tightening the bolts 113 a pressing force is applied in the axial direction between the engaging face 105 of the bearing structural member 104 and the engaging face 106 of the bearing member 102. Here the engaging faces 105 and 106 which are both inclined at an angle of approximately 45 degrees to the axial and radial directions, are closely engaged together. As a result, the axial pressing force is divided into axial (thrust) and radial components which are uniform over the whole of the tapered engaging faces 105 and 106. Furthermore, since the solid lubricant material such as graphite or carbon which constitutes the bearing member 102 has a smaller Young's modulus than that of the metallic bearing structural member 104, the bearing members 102 are deformed to follow the shape of the bearing structural member 104 with application of the axial pressing force, so that both members are tightly fitted together, resulting in that leakage of compressed air from the supply groove 125 can be prevented.

The inner ring 103 of this embodiment is comprised of the two divided mating members 118 and the cylindrical shaped collar 120 disposed therebetween. The mating members 118 each have an inner bore 122 formed therein so as to be continuous with an inner bore 121 of the collar 120. The collar 120 is fitted into recess portions 123 formed in the axially opposite portions of the mating members 118, so that the axially opposite ends of the collar 120 axially control the end faces of the recess portions 123 and thus position the mating members 118 with a predetermined spacing therebetween. The respective mating members 118 are fixedly attached to the collar 120 by means of fastening member (not shown in the figure).

The mating members 118 each have a frusto-conical bearing surface 112 formed on the radially outer peripheral surfaces thereof, which oppose the respective bearing surfaces 110 of the bearing members 102 across a bearing gap or clearance. Consequently, in assembling the hydrostatic gas bearing of the present embodiment, the bearing members 102 are fixedly attached to the bearing structural member 104 by means of the attachment members 107 and the bolts 113 as previously described, and one of the mating members 118 of an inner ring 103 is fixedly attached to the collar 20 by fastening members such as bolts (not shown in the figure), so that the bearing surface 112 of this mating member 118 is then positioned opposite to the corresponding bearing surface 110 of one of the bearing members 102. Subsequently, the bearing surface 112 of the other mating member 118 is positioned opposite to the corresponding bearing surface 110 of the other bearing member 102, with the other mating member 118 abutted against the collar 120, and fixedly attached thereto by fastening members such as bolts (not shown in the figure).

Compressed air is discharged from the orifices 111 so as to form an air layer between the bearing surfaces 110 and 112, so that a pressure force is created therebetween, so as to freely rotatably support the inner rings 103 in a non-contact relationship.

In this case also, as with the previous case, since the external force, even if it exceeds that allowable for the bearing, is applied as a uniform force in both radial and axial (thrust) directions over the entire face of the tapered engaging faces 105 and 106, the bearing members 102 remain in position with respect to the bearing structural member 104. Also since air leakage and deformation of the bearing surfaces is eliminated, then in particular, there is no longer the problem of seizing between the bearing surfaces 110 and 112.

The above description has only related to a hydrostatic gas bearing wherein the bearing surfaces are defined by a flared surface which is inclined at an angle of approximately 45 degrees with respect to the axial and radial directions. However the arrangement of the bearing surfaces in the hydrostatic gas bearing of the present invention are not limited to this, and may encompass arrangements for radial bearings wherein the bearing surfaces lie parallel to the axial direction, or for thrust bearings wherein the bearing surfaces lie parallel to the radial direction. In these cases, the taper shape of the engaging faces is preferably close to that of the bearing surface.

Furthermore, the bearing members 2, 102 may be made from a ferrous metal or alloy material while the bearing structural member 4, 104 may be made of a solid lubricant material. Moreover, the hydrostatic gas bearing may be a throttle of the autogenous type, the orifice type, the surface type, or the porous material type.

With the hydrostatic gas bearing according to the present invention as described above, the axial pressing force applied to the bearing member by the attachment member is distributed as a uniform pressing force with respect to the tapered engaging face. The likelihood of uneven deformation of the bearing member is therefore minimized so that the accuracy of the bearing surface is maintained, and leakage of the supplied air avoided. Furthermore, even with a very large external force, since this is taken by the tapered engaging face, there is little likelihood of displacement of the bearing member with respect to the bearing structural member. Moreover, since it is possible to have the same number of attachment members as bearing members, the number of components can be reduced, thereby lowering costs.

What is claimed is:

1. A hydrostatic gas bearing comprising a bearing structural member, a bearing member which is pressingly attached to the bearing structural member so as to support a rotating body around an axis, and an attachment member for securing the bearing member to the bearing structural member, the bearing member and bearing structural member having engaging faces engaged with each other, the engaging faces inclined in a taper shape with respect to the axis, and the bearing member being pressed in an axial direction by the attachment member and thereby fastened to the bearing structural member.

2. The hydrostatic gas bearing of claim 1, wherein the engaging faces are each formed in a frusto-conical surface to form a conical bearing face.

3. A hydrostatic gas bearing comprising a pair of flared bearing members having larger and smaller axial ends, a pair of frusto-conical bearing structural members concentrical with the pair of bearing members, the flared bearing members each having a radially outer bearing surface axially between the larger and smaller axial ends to rotatably support a rotating member such that the outer bearing surfaces are faced to each other, the rotating member having a radially inner surface mating with the outer bearing surfaces of the bearing members, a pair of attachment means each provided at the smaller axial end of the bearing member, so that the bearing members are securely connected to the bearing structural members, respectively, an air supply means provided through each of the bearing members to supply air to between the bearing surface of the bearing member and the rotating member, and a collar with a clamp means provided between the bearing structural members to axially tighten the bearing structural members to each other, so that the bearing member is pressed in an axial direction by the attachment member and thereby fastened to the bearing structural member.

4. A hydrostatic gas bearing comprising a pair of flared bearing members having larger and smaller axial ends and inner and outer peripheral surfaces between the axial ends, the inner peripheral surfaces flared axially outwards to form a bearing surface, respectively, to support a rotating member, a single bearing structural member having an inner peripheral surface mating with the outer peripheral surfaces of the bearing members, the rotating member comprised of a pair of frusto-conical members each having a smaller axially inner end, such that the pair of frusto-conical members are mated with the inner peripheral surfaces of the bearing members, respectively, a pair of attachment means each provided at the larger axial end of the bearing member, so that the bearing members are securely connected to the single bearing structural member, an air supply means provided through the bearing member to form an air layer between the bearing surface of the bearing member and the frusto-conical member, and a collar with a clamp means provided axially between the frusto-conical members to axially tighten the frusto-conical members to each other, so that the bearing member is pressed in an axial direction by the attachment member and thereby fastened to the bearing structural member.

5. The hydrostatic gas bearing of any one of claims 1 to 4, wherein the bearing member is made of a first material, and the bearing structural member is made of a second material, wherein the first material has a smaller Young's modulus than the second material.

* * * * *